(12) United States Patent
Maxwell

(10) Patent No.: US 8,960,164 B1
(45) Date of Patent: Feb. 24, 2015

(54) VOLUMETRIC EXPANSION ASSEMBLY

(71) Applicant: Curtis E. Maxwell, Sandy, OR (US)

(72) Inventor: Curtis E. Maxwell, Sandy, OR (US)

(*) Notice: Subject to any disclaimer, the term of this patent is extended or adjusted under 35 U.S.C. 154(b) by 50 days.

(21) Appl. No.: 13/957,120

(22) Filed: Aug. 1, 2013

(51) Int. Cl.
F02M 31/18 (2006.01)

(52) U.S. Cl.
USPC .............................. 123/538; 123/549; 123/541

(58) Field of Classification Search
USPC .................. 123/536–538, 541, 549, 557; 315/315.41
See application file for complete search history.

(56) References Cited

U.S. PATENT DOCUMENTS

| | | | |
|---|---|---|---|
| 4,064,852 A * | 12/1977 | Fulenwider, Jr. | 123/25 B |
| 4,105,004 A | 8/1978 | Asai et al. | |
| 4,176,637 A * | 12/1979 | Cole | 123/537 |
| D273,296 S | 4/1984 | Dilliner | |
| 4,715,353 A | 12/1987 | Koike et al. | |
| 4,784,323 A | 11/1988 | Miller | |
| 4,862,858 A * | 9/1989 | Goldsberry | 123/538 |
| 5,342,586 A * | 8/1994 | Park | 422/211 |
| 6,012,915 A * | 1/2000 | Mori et al. | 431/4 |
| 6,508,918 B2 * | 1/2003 | Campagna et al. | 204/164 |
| 7,036,492 B2 * | 5/2006 | Yoshimoto | 123/536 |
| 7,658,183 B1 | 2/2010 | Johnson | |
| 8,245,951 B2 | 8/2012 | Fink et al. | |
| 8,499,746 B2 * | 8/2013 | Ikeda et al. | 123/536 |
| 8,602,005 B2 * | 12/2013 | Ikeda | 123/536 |

* cited by examiner

Primary Examiner — M. McMahon

(57) ABSTRACT

A volumetric expansion assembly for increasing the volume of a gaseous fuel through electromagnetic means includes a housing that may be operationally coupled to an engine. A tubular fuel line is operationally coupled to the housing. The tubular fuel line is operationally coupled between a fuel supply and the engine. The tubular fuel line delivers the fuel to the engine. A magnetron is operationally coupled to the housing. The magnetron heats the tubular fuel line so a volume of the fuel in the tubular fuel line is increased. A tubular cooling line is operationally coupled to the tubular fuel line. The tubular cooling line is operationally coupled to a coolant supply. The tubular cooling line cools the tubular fuel line after the tubular fuel line is heated by the magnetron.

17 Claims, 3 Drawing Sheets

US 8,960,164 B1

VOLUMETRIC EXPANSION ASSEMBLY

BACKGROUND OF THE DISCLOSURE

1. Field of the Disclosure

The disclosure relates to volumetric expansion devices and more particularly pertains to a new volumetric expansion device for increasing the volume of a gaseous fuel through electromagnetic means.

2. Summary of the Disclosure

An embodiment of the disclosure meets the needs presented above by generally comprising a housing that may be operationally coupled to an engine. A tubular fuel line is operationally coupled to the housing. The tubular fuel line is operationally coupled between a fuel supply and the engine. The tubular fuel line delivers the fuel to the engine. A magnetron is operationally coupled to the housing. The magnetron heats the tubular fuel line so a volume of the fuel in the tubular fuel line is increased. A tubular cooling line is operationally coupled to the tubular fuel line. The tubular cooling line is operationally coupled to a coolant supply. The tubular cooling line cools the tubular fuel line after the tubular fuel line is heated by the magnetron.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
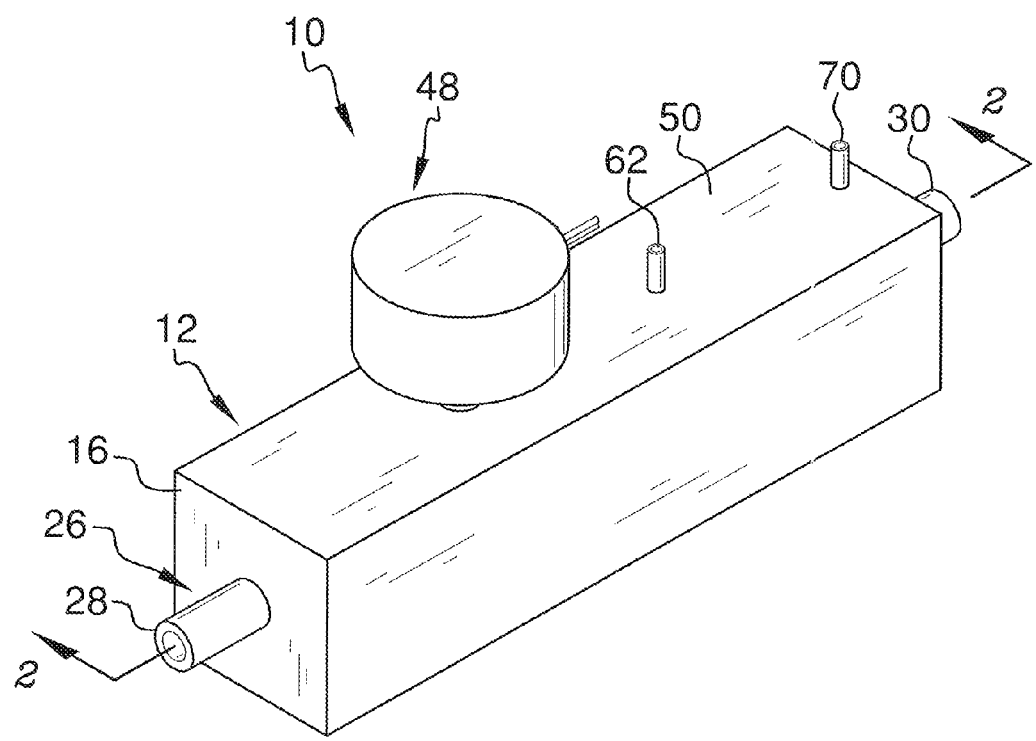
FIG. 1 is a top perspective view of a volumetric expansion assembly according to an embodiment of the disclosure.
Figure 2:
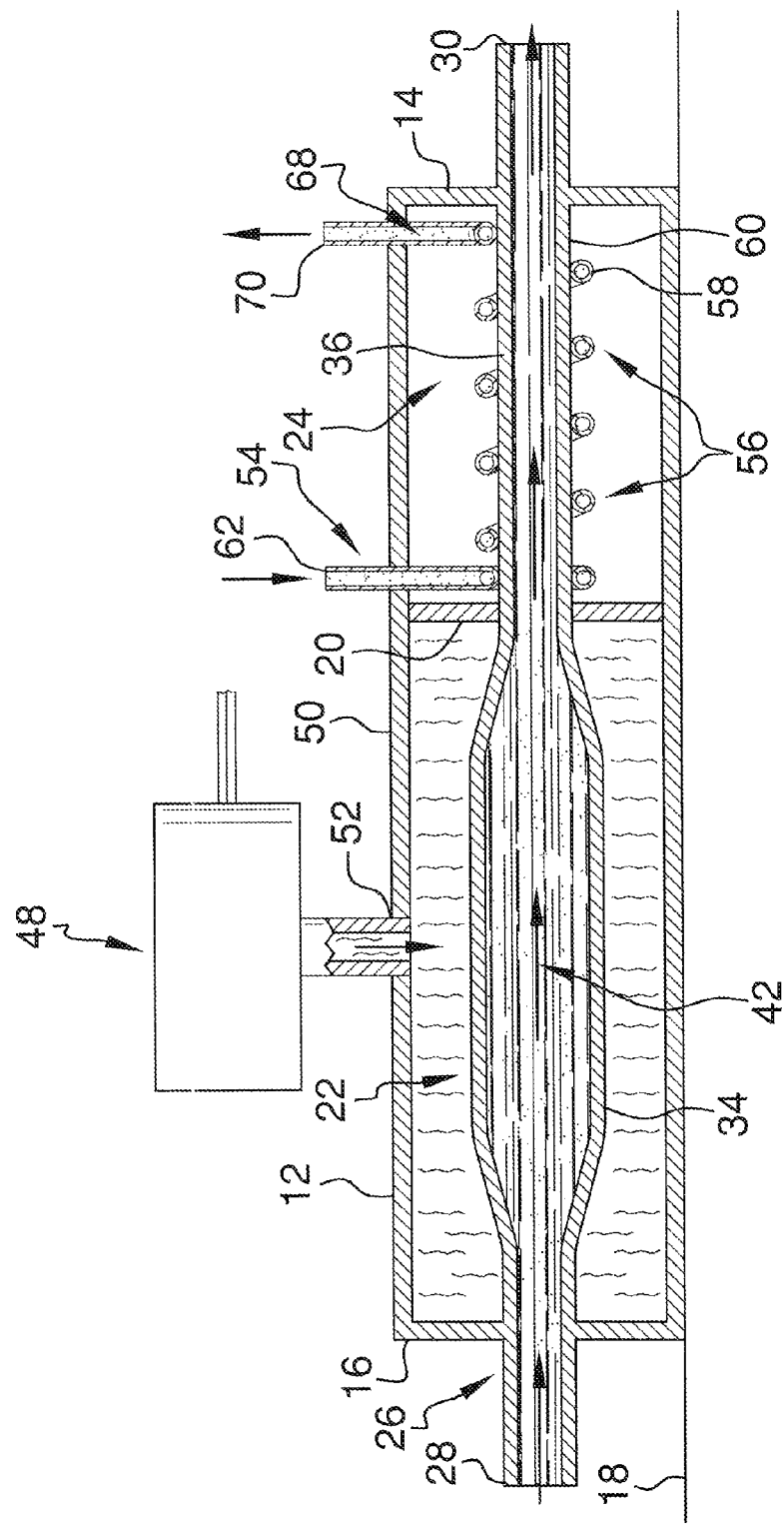
FIG. 2 is a cross sectional view taken along line 2-2 of FIG. 1 of an embodiment of the disclosure.
Figure 3:
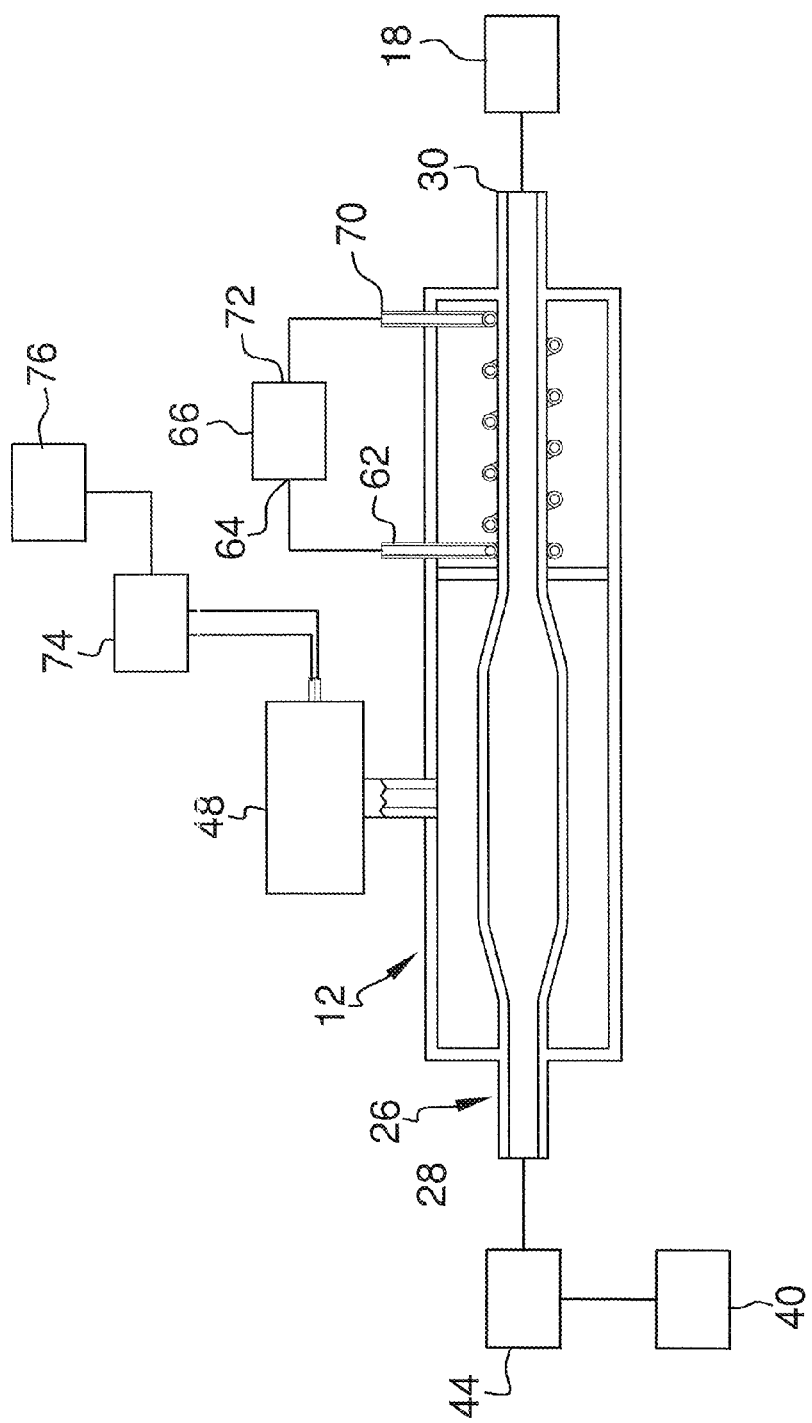
FIG. 3 is a schematic view of an embodiment of the disclosure.

With reference now to the drawings, and in particular to FIGS. 1 through 3 thereof, a new volumetric expansion device embodying the principles and concepts of an embodiment of the disclosure and generally designated by the reference numeral 10 will be described.

As best illustrated in FIGS. 1 through 3, the volumetric expansion assembly 10 generally comprises a housing 12 elongated along a longitudinal axis extending through a front wall 14 and a back wall 16 of the housing 12. The housing 12 has a rectangular parallelepiped shape that may have a length between 20 cm and 25 cm and a height and weight between 5 cm and 8 cm. Moreover, the housing 12 may be operationally coupled to an engine 18. The engine 18 may comprise an internal combustion engine of any conventional design. A dividing wall 20 is positioned within an interior of the housing 12 so the dividing wall 20 defines an expansion space 22 and a cooling space 24 within the interior of the housing 12. Lastly, the expansion space 22 is discrete from the cooling space 24.

A tubular fuel line 26 is coupled to the housing 12. Moreover, the tubular fuel line 26 extends through the front wall 14, the dividing wall 20 and the back wall 16 of the housing 12. A supply end 28 of the tubular fuel line 26 is positioned proximate the back wall 16 of the housing 12 and a feed end 30 of the tubular fuel line 26 is positioned proximate the front wall 14 of the housing 12. The tubular fuel line 26 may be comprised of a rigid and fluid impermeable material that can be heated with microwave energy.

An expansion portion 34 of the tubular fuel line 26 has a diameter is greater than a diameter of a cooling portion 36 of the tubular fuel line 26. Additionally, the expansion portion 34 of the tubular fuel line 26 is positioned within the expansion space 22 in the housing 12. The expansion portion 34 of the tubular fuel line 26 extends between the back wall 16 and the dividing wall 20 of the housing 12. Moreover, the expansion portion 34 of the tubular fuel line 26 may have an inside diameter between 12 mm and 19 mm. The cooling portion 36 of the tubular fuel line 26 is positioned within the cooling space 24 in the housing 12. The cooling portion 36 of the tubular fuel line 26 extends between the dividing wall 20 and the front wall 14 of the housing. Lastly, the cooling portion 36 of the tubular fuel line 26 may have an inside diameter between 6 mm and 12 mm.

The supply end 28 of the tubular fuel line 26 is fluidly coupled to a fuel source 40. The fuel source 40 may be a fuel pump of any conventional design and the fuel 42 may comprise gasoline. A valve 44 is fluidly coupled between the supply end 38 of the tubular fuel line 26 and the fuel source 40. The valve 44 prevents the fuel 42 from flowing from the supply end 38 of the tubular fuel line 26 back to the fuel source 40. Lastly, the valve 44 may be a one-way fuel valve of any conventional design. The feed end 30 of the tubular fuel line 26 is fluidly coupled to the engine 18 so the tubular fuel line 26 delivers the fuel 42 to the engine 18.

A magnetron 48 is coupled to a top wall 50 of the housing 12. An emitter 52 of the magnetron 48 extends through the top wall 50 of the housing 12 so the emitter 52 selectively emits RF energy into the expansion space 22 in the housing 12. The magnetron 48 may be a microwave magnetron of any conventional design with an operational output between 100 watts and 200 watts. The magnetron 48 selectively heats the tubular fuel line 26 so a volume of the fuel 42 in the tubular fuel line 26 is increased. The volume of the fuel 42 is increased through molecular excitation due to exposure to microwave radiation.

A tubular cooling line 54 comprises a plurality of coils 56 wrapped around the cooling portion 36 of the tubular fuel line 26. An outer wall 58 of the tubular cooling line 54 abuts an outer wall 60 of the cooling portion 36 of the tubular fuel line 26 so the tubular cooling line 54 is in thermal communication with the tubular fuel line 26. The plurality of coils 56 extends between the dividing wall 20 of the housing 12 and the front wall 14 of the housing 12. The tubular cooling line 54 may be comprised of a fluid impermeable and thermally conductive material.

A supply end 62 of the tubular cooling line 54 extends upwardly through the top wall 50 of the housing 12 proximate the dividing wall 20 of the housing 12. The supply end 62 of the tubular cooling line 54 is fluidly coupled to a supply side 64 of a coolant supply 66. A coolant 68 is delivered into the tubular cooling line 54 so the tubular fuel line 26 exchanges heat with the tubular cooling line 54 after the tubular fuel line 26 is heated by the magnetron 48. The coolant supply 66 may be an automotive air conditioning system of any conventional design. Additionally, the coolant 68 may comprise a CFC, an HCFC or other gaseous coolant of any conventional design delivered from the automotive air conditioning system.

A return end 70 of the tubular cooling line 54 extends upwardly through the top wall 50 of the housing 12 proximate the front wall 14 of the housing 12. The return end 70 of the tubular cooling line 54 is fluidly coupled to a return side 72 of the coolant supply 66. After the tubular cooling line 54 absorbs the heat from the tubular fuel line 26, the coolant 68 is returned to the coolant supply 66 so the tubular cooling line 54 exchanges heat with the coolant supply 66.

A power supply 74 is electrically coupled to the magnetron 48. The power supply 74 may comprise an inverter of any conventional design. Moreover, the power supply 74 is electrically coupled to an automotive electrical system 76. The power supply 74 converts the DC current of the automotive electrical system 76 into AC current for the magnetron 48. Lastly, the power supply 74 may have an operational output between 110 VAC and 120 VAC.

In use, the magnetron 48 causes the fuel 42 to expand in the expansion portion 34 of the tubular fuel line 26 through exposure to microwave energy. The expanded fuel 42 enters the cooling portion 36 of the tubular fuel line 26 to be cooled down. The increased volume of the fuel 42 increases an efficiency of the engine 18 in order to improve the performance of the engine 18 from an emissions standpoint and from a miles-per-gallon standpoint.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A volumetric expansion assembly for increasing the volume of a gaseous fuel through electromagnetic means, said assembly comprising:
   a housing configured to be operationally coupled to an engine;
   a tubular fuel line operationally coupled to said housing, said tubular fuel line being operationally coupled between a fuel supply and the engine wherein said tubular fuel line delivers the fuel to the engine;
   a magnetron operationally coupled to said housing, said magnetron heating the tubular fuel line wherein a volume of the fuel in said tubular fuel line is increased; and
   a tubular cooling line operationally coupled to said tubular fuel line, said tubular cooling line being operationally coupled to a coolant supply wherein said tubular cooling line cools the tubular fuel line after the tubular fuel line is heated by said magnetron.

2. The assembly according to claim 1, further comprising said housing being elongated along a longitudinal axis extending through a front wall and a back wall of said housing wherein said housing has a rectangular parallelepiped shape.

3. The assembly according to claim 1, further comprising a dividing wall positioned within an interior of said housing wherein said dividing wall defines an expansion space and a cooling space within the interior of said housing wherein said expansion space is discrete from said cooling space.

4. The assembly according to claim 1, further comprising said tubular fuel line being coupled to said housing wherein said tubular fuel line extends through a front wall, a dividing wall and a back wall of said housing wherein a supply end of said tubular fuel line is positioned proximate said back wall of said housing and a feed end of said tubular fuel line is positioned proximate said front wall of said housing.

5. The assembly according to claim 4, further comprising:
   said supply end of said tubular fuel line being fluidly coupled to a fuel source; and
   said feed end of said tubular fuel line being fluidly coupled to the engine.

6. The assembly according to claim 1, further comprising an expansion portion of said tubular fuel line having a diameter being greater than a diameter of a cooling portion of said tubular fuel line.

7. The assembly according to claim 5, further comprising said expansion portion of said tubular fuel line being positioned within an expansion space in said housing wherein said expansion portion of said tubular fuel line extends between a back wall and a dividing wall of said housing.

8. The assembly according to claim 5, further comprising said cooling portion of said tubular fuel line being positioned within a cooling space in said housing wherein said cooling portion of said tubular fuel line extends between a dividing wall and a front wall of said housing.

9. The assembly according to claim 1, further comprising said magnetron being coupled to a top wall of said housing wherein an emitter of said magnetron extends through said top wall of said housing wherein said emitter selectively emits RF energy into an expansion space in said housing.

10. The assembly according to claim 1, further comprising said tubular cooling line comprising a plurality of coils wrapped around a cooling portion of said tubular fuel line wherein an outer wall of said tubular cooling line abuts an outer wall of said cooling portion of said tubular fuel line wherein said tubular cooling line is in thermal communication with said tubular fuel line.

11. The assembly according to claim 9, further said plurality of coils extending between a dividing wall of said housing and a front wall of said housing.

12. The assembly according to claim 1, further comprising a supply end of said tubular cooling line extending upwardly through a top wall of said housing proximate a dividing wall of said housing.

13. The assembly according to claim 12, further comprising said supply end of said tubular cooling line being fluidly coupled to a supply side of a coolant supply wherein a coolant is delivered into said tubular cooling line wherein said tubular fuel line exchanges heat with the said tubular cooling line.

14. The assembly according to claim 1, further comprising a return end of said tubular cooling line extending upwardly through a top wall of said housing proximate a front wall of said housing.

15. The assembly according to claim 14, further comprising said return end of said tubular cooling line being fluidly coupled to a return side of a coolant supply wherein the coolant is returned to the coolant supply wherein said tubular cooling line exchanges heat with the coolant supply.

16. The assembly according to claim 1, further comprising a power supply electrically coupled to said magnetron.

17. A volumetric expansion assembly for increasing the volume of a gaseous fuel through electromagnetic means, said assembly comprising:
- a housing elongated along a longitudinal axis extending through a front wall and a back wall of said housing wherein said housing has a rectangular parallelepiped shape wherein said housing is configured to be operationally coupled to an engine, said housing further comprising a dividing wall positioned within an interior of said housing wherein said dividing wall defines an expansion space and a cooling space within the interior of said housing wherein said expansion space is discrete from said cooling space;
- a tubular fuel line coupled to said housing wherein said tubular fuel line extends through said front wall, said dividing wall and said back wall of said housing wherein a supply end of said tubular fuel line is positioned proximate said back wall of said housing and a feed end of said tubular fuel line is positioned proximate said front wall of said housing;
- an expansion portion of said tubular fuel line having a diameter being greater than a diameter of a cooling portion of said tubular fuel line, said expansion portion of said tubular fuel line being positioned within said expansion space in said housing wherein said expansion portion of said tubular fuel line extends between said back wall and said dividing wall of said housing, said cooling portion of said tubular fuel line being positioned within said cooling space in said housing wherein said cooling portion of said tubular fuel line extends between said dividing wall and said front wall of said housing;
- a supply end of said tubular fuel line being fluidly coupled to a fuel source;
- a feed end of said tubular fuel line being fluidly coupled to the engine wherein said tubular fuel line delivers the fuel to the engine;
- a magnetron coupled to a top wall of said housing wherein an emitter of said magnetron extends through said top wall of said housing wherein said emitter selectively emits RF energy into said expansion space in said housing wherein said magnetron selectively heats the tubular fuel line wherein a volume of the fuel in said tubular fuel line is increased; and
- a tubular cooling line comprising a plurality of coils wrapped around said cooling portion of said tubular fuel line wherein an outer wall of said tubular cooling line abuts an outer wall of said cooling portion of said tubular fuel line wherein said tubular cooling line is in thermal communication with said tubular fuel line, said plurality of coils extending between said dividing wall of said housing and said front wall of said housing;
- a supply end of said tubular cooling line extending upwardly through said top wall of said housing proximate said dividing wall of said housing, said supply end of said tubular cooling line being fluidly coupled to a supply side of a coolant supply wherein a coolant is delivered into said tubular cooling line wherein said tubular fuel line exchanges heat with the said tubular cooling line after the tubular fuel line is heated by said magnetron;
- a return end of said tubular cooling line extending upwardly through said top wall of said housing proximate said front wall of said housing, said return end of said tubular cooling line being fluidly coupled to a return side of the coolant supply wherein the coolant is returned to the coolant supply wherein said tubular cooling line exchanges heat with the coolant supply; and
- a power supply electrically coupled to said magnetron.

\* \* \* \* \*